US012298092B2

(12) United States Patent
Stewart

(10) Patent No.: US 12,298,092 B2
(45) Date of Patent: May 13, 2025

(54) HVAC EXTERIOR CLEANING PIPEWORK

(71) Applicant: Carroll Stewart, Nashville, NC (US)

(72) Inventor: Carroll Stewart, Nashville, NC (US)

( * ) Notice: Subject to any disclaimer, the term of this patent is extended or adjusted under 35 U.S.C. 154(b) by 609 days.

(21) Appl. No.: 17/527,373

(22) Filed: Nov. 16, 2021

(65) Prior Publication Data

US 2023/0152050 A1 May 18, 2023

(51) Int. Cl.
*F28G 15/02* (2006.01)
*B08B 3/02* (2006.01)
*F28G 1/16* (2006.01)
*F28G 9/00* (2006.01)

(52) U.S. Cl.
CPC ................ *F28G 15/02* (2013.01); *B08B 3/02* (2013.01); *F28G 1/166* (2013.01); *B08B 2203/0223* (2013.01); *F24F 2221/225* (2013.01); *F28G 9/00* (2013.01)

(58) Field of Classification Search
CPC . F28G 9/00; F28G 1/166; F28G 15/02; B08B 3/02; B08B 2203/0223; F24F 2221/225
See application file for complete search history.

(56) References Cited

U.S. PATENT DOCUMENTS 4,141,754 A * 2/1979 Frauenfeld ............. F28G 9/005 165/95
4,332,292 A * 6/1982 Garberick ................ F28G 1/16 165/95
4,884,416 A * 12/1989 Hwang ..................... F24F 8/90 55/318
5,117,644 A * 6/1992 Fought .................... F25B 39/04 62/506
5,186,240 A * 2/1993 Kennon .................. F28G 3/166 165/95
5,279,357 A * 1/1994 Kennon .................. F28G 1/166 165/95
5,605,052 A * 2/1997 Middleton ............ F24F 5/0035 62/305
6,318,108 B1 * 11/2001 Holstein ............... F24F 13/222 62/279
6,666,038 B1 * 12/2003 Hynes ..................... F25B 47/00 62/171
6,978,793 B1 * 12/2005 Krueger .................. F28F 3/083 165/95
7,207,182 B1 * 4/2007 Schoonover .......... F24F 1/0071 62/304
7,234,316 B2 * 6/2007 Tien .......................... F24F 1/50 62/506
8,468,648 B1 * 6/2013 Smith ....................... B08B 5/04 15/381

(Continued)

*Primary Examiner* — Benjamin L Osterhout
(74) *Attorney, Agent, or Firm* — Lyman Moulton, Esq.; Moulton Patents, PLLC

(57) ABSTRACT

The HVAC exterior cleaning pipework is a system attachable to a HVAC unit, such that the PVC pipework can clean the exterior of the unit by means of strategically placed sprayer valves. The pipework is extendable, such that it can expand or retract to meet the exact dimensions of the specific HVAC unit whereon it should be attached. The pipework may be connected directly to a hose with sufficiently pressurized water, or the integrated pump may assist in the flow of water. The spray heads and the pump have removable components whereby they can be cleaned separately when needed.

14 Claims, 2 Drawing Sheets

(56) References Cited

U.S. PATENT DOCUMENTS

| | | | | |
|---|---|---|---|---|
| 9,593,895 | B2 * | 3/2017 | Kim | A46B 13/026 |
| 11,371,788 | B2 * | 6/2022 | Johns | F28G 1/163 |
| 11,408,694 | B2 * | 8/2022 | Al-Otaibi | B05B 1/20 |
| 2014/0041834 | A1 * | 2/2014 | Kloeppner | F28F 25/02<br>165/104.13 |
| 2015/0144303 | A1 * | 5/2015 | Burfeind | B08B 3/028<br>165/95 |

* cited by examiner

HVAC EXTERIOR CLEANING PIPEWORK

BACKGROUND

Heating, ventilation, and air conditioning (HVAC) is the technology of indoor and vehicular environmental comfort. Its goal is to provide thermal comfort and acceptable indoor air quality. HVAC system design is a subdiscipline of mechanical engineering, based on the principles of thermodynamics, fluid mechanics and heat transfer. There have been no products available as original equipment or as an aftermarket to address this problem.

All modern air conditioning systems, even small window package units, are equipped with internal air filters. These are generally of a lightweight gauze-like material, and must be replaced or washed as conditions warrant. Failure to replace these filters as needed will contribute to a lower heat exchange rate, resulting in wasted energy, shortened equipment life, and higher energy bills; low air flow can result in iced-over evaporator coils, which can completely stop air flow. Additionally, very dirty or plugged filters can cause overheating during a heating cycle, and can result in damage to the system or even fire. There have been no products available as original equipment or as an aftermarket to address this problem either.

There exists a need for a HVAC exterior cleaning pipework that is not being met by any known or disclosed device or system of present.

SUMMARY OF THE INVENTION

The HVAC exterior cleaning pipework is a system attachable to a HVAC unit, such that the PVC pipework can clean the exterior of the unit by means of strategically placed sprayer valves. The pipework is extendable, such that it can expand or retract to meet the exact dimensions of the specific HVAC unit whereon it should be attached. The pipework may be connected directly to a hose with sufficiently pressurized water, or the integrated pump may assist in the flow of water. The spray heads and the pump have removable components whereby they can be cleaned separately when needed.

A cleaning device disclosed includes an extendable pipework configured to clean an outside of an HVAC (heating ventilating air conditioning) unit via a washing fluid and a distribution thereon. The extendable pipework includes slidable pipe sections and slidable pipe joints. The disclosure also includes a plurality of connector straps comprising a slidable connection to the extendable pipework and a fixed connection to the hvac unit. The disclosure further includes a plurality of sprayer valves in a communication with the washing fluid configured to cover an outside of the hvac unit in a top-down distribution thereon.

Figure 1:
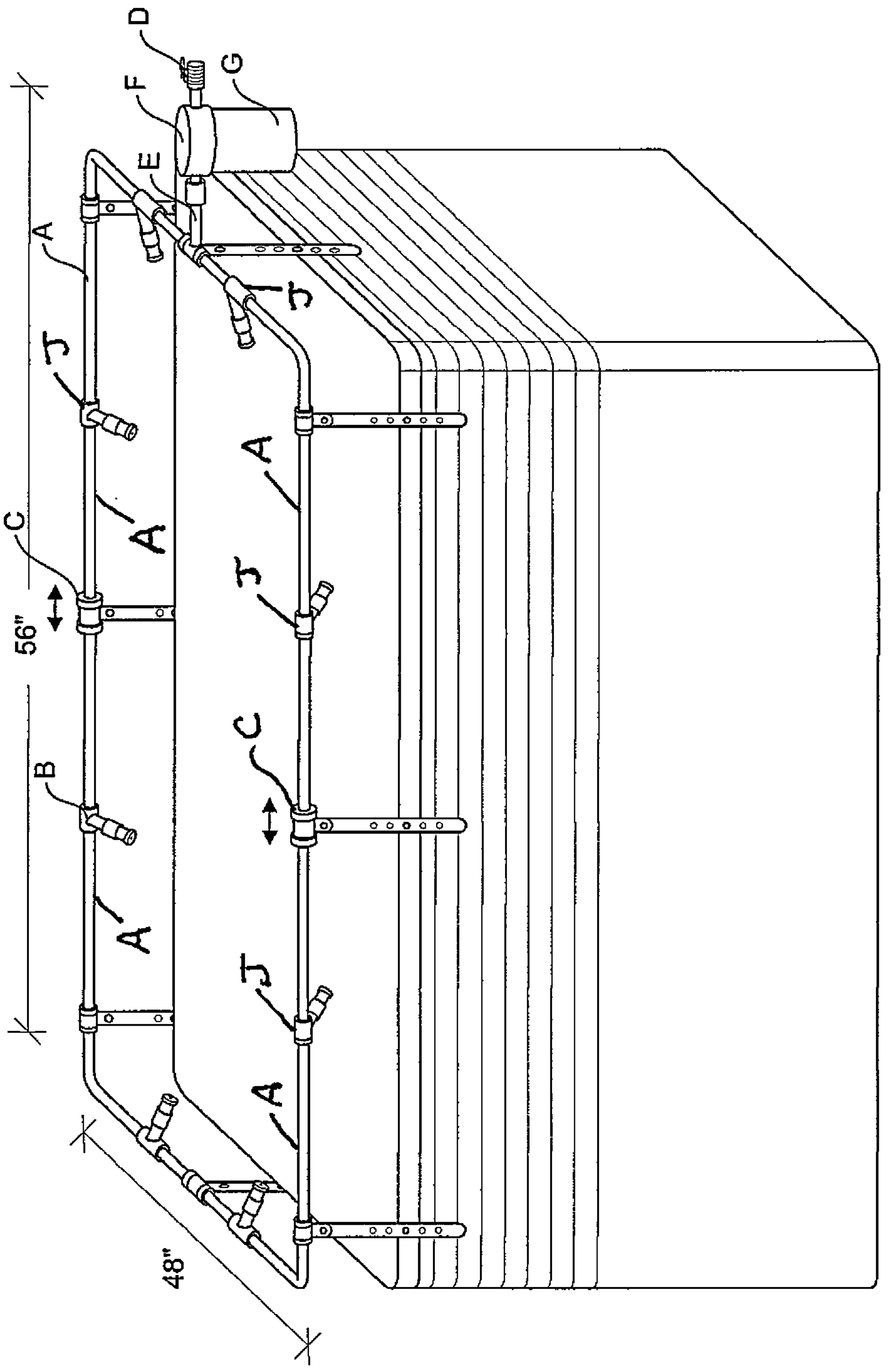
FIG. 1 is a holistic view of the HVAC exterior cleaning pipework installed on an HVAC unit in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term [term] is used to refer to [describe, rest of sentence]. The term [term] refers to [describe, rest of sentence].

FIG. 1 is a holistic view of the HVAC exterior cleaning pipework installed on an HVAC unit in accordance with an embodiment of the present disclosure. The extendable pipework is comprised primarily of slidable pipe sections of PVC pipe A and slidable pipe joints J, which may be either one-half inch or three-fourths inch in diameter. Strategically placed around the pipework are sprayer valves B with removable heads for cleaning. Additionally, there are sliding adjustable connector straps C to connect to the HVAC unit. At one end of the pipework is a small structure to receive the input of water. This structure connects to a water hose at the outlet D, then feeds the water through a pump with a timer E, powered by 110 volts or by solar power. This pump F is capable of exerting thirty to forty pounds of pressure. The pump has a removable plastic jar G for use of cleaning. Lastly, the water flows from the pump through the four inch pipe into the pipework system, to be sprayed onto the HVAC unit. Solar cells S sit on a topside and on a lateral side of the HVAC unit according to design implementation.

Figure 2:
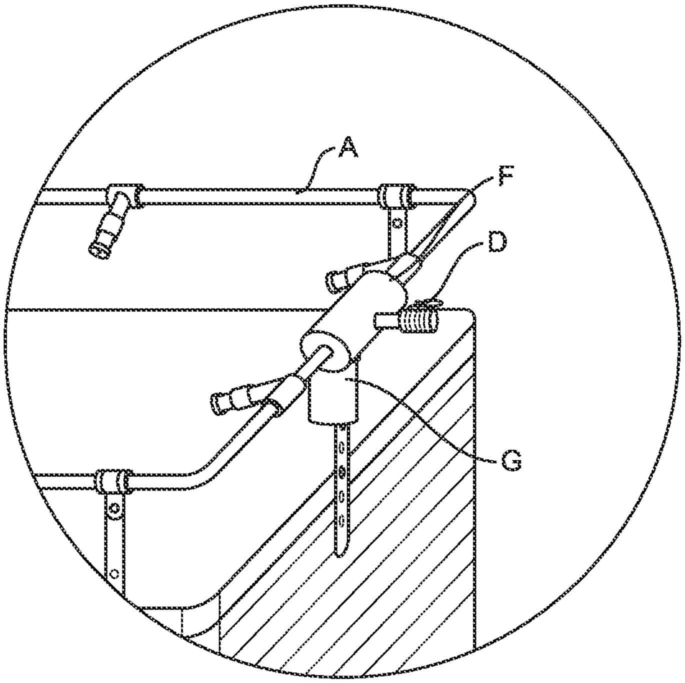
FIG. 2 is a view of the HVAC exterior cleaning pipework, in which it is demonstrated how a built-in pump slightly alters the design of the pipework in accordance with an embodiment of the present disclosure.

FIG. 2 is a view of the HVAC exterior cleaning pipework, in which it is demonstrated how a built-in pump slightly alters the design of the pipework in accordance with an embodiment of the present disclosure. The PVC pipe A that is either one-half inch or three-quarters inch is depicted, similarly to FIG. 1. In this version however, the water from a hose goes through the water hose connector D then to the pump F, with the associated cleaning jar G, which feeds the water out both ends directly into the pipework system. A clearance of the extendable pipework above the HVAC unit provides clearance of irregular surfaces and a spray angle for the sprayer valves thereto. A cleaning fluid includes water and oxidizing and reactive agents formulated to clean dirt and grease from the HVAC unit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A cleaning device comprising:

an extendable pipework configured to clean an outside of an HVAC (heating ventilating air conditioning) unit via a washing fluid and a distribution thereon;

a plurality of connector straps comprising a slidable connection to the extendable pipework and a fixed connection to the hvac unit; and a plurality of sprayer valves in a communication with the washing fluid configured to cover an outside of the hvac unit in a top-down distribution thereon, wherein the extendable pipework is extendable across the hvac unit via an addition of slidable pipe joints and slidable pipe sections.

2. The cleaning device of claim 1, wherein the distribution of the extendable pipework extends across a top side of the hvac unit.

3. The cleaning device of claim 1, wherein the connector straps comprise a slidable connection to the extendable pipework via annular compression straps.

4. The cleaning device of claim 1, wherein the connector straps comprise a fixed connection to the hvac unit via a fastener.

5. The cleaning device of claim 1, further comprising an electric pump configured to pressurize the cleaning fluid in the extendable pipework.

6. The cleaning device of claim 1, further comprising a garden hose connector to the extendable pipework.

7. The cleaning device of claim 1, wherein a volume of cleaning fluid distributed from the sprayer valves is adjustable via a twisting of a sprayer valve against the extendable pipework.

8. The cleaning device of claim 1, wherein any one of the plurality of connector straps is slid along the extendable pipework based to an available fastener location on the hvac unit.

9. The cleaning device of claim 1, wherein the distribution of the extendable pipework includes a lateral side of the hvac unit.

10. The cleaning device of claim 1, wherein the distribution of the extendable pipework includes a topside of the hvac unit.

11. The cleaning device of claim 1, further comprising a clearance of the extendable pipework from the outside of the hvac unit via a length of the plurality of connector straps between the extendable pipework and the hvac unit.

12. The cleaning device of claim 1, further comprising a timer configured to control an operation of the sprayer valves.

13. The cleaning device of claim 1, wherein the extendable pipework is retractable in regards to a portion of the outside of the hvac unit.

14. The cleaning device of claim 1, wherein the extendable pipework is extendable to a topside and a lateral side of the outside of the hvac unit.

* * * * *